US007841612B2

(12) United States Patent
French

(10) Patent No.: US 7,841,612 B2
(45) Date of Patent: Nov. 30, 2010

(54) BICYCLE FORK AND STEERING TUBE

(75) Inventor: George French, Sheffield (GB)

(73) Assignee: Bear Corporation, Cerritos, CA (US)

(*) Notice: Subject to any disclaimer, the term of this patent is extended or adjusted under 35 U.S.C. 154(b) by 0 days.

(21) Appl. No.: 12/475,335

(22) Filed: May 29, 2009

(65) Prior Publication Data

US 2009/0236817 A1 Sep. 24, 2009

Related U.S. Application Data

(63) Continuation of application No. 11/488,404, filed on Jul. 19, 2006, now Pat. No. 7,591,474.

(51) Int. Cl.
*B62K 1/00* (2006.01)

(52) U.S. Cl. ....................... 280/279; 280/275; 280/280; 280/281.1

(58) Field of Classification Search ................. 280/279, 280/280, 275, 281.1
See application file for complete search history.

(56) References Cited

U.S. PATENT DOCUMENTS 623,495 A 4/1899 Trebert
649,633 A 5/1900 Fauber
5,002,297 A 3/1991 Klein
5,025,977 A 6/1991 Hartman
5,273,301 A 12/1993 Klein
5,292,143 A * 3/1994 Stauch et al. ............... 280/279
5,364,115 A 11/1994 Klein et al.
5,405,202 A * 4/1995 Chi ........................... 384/545
5,496,126 A 3/1996 Lin
5,615,585 A 4/1997 Chi
5,692,764 A 12/1997 Klein et al.
5,791,671 A * 8/1998 Tang et al. .................. 280/264
5,992,869 A 11/1999 Yi-Chen
6,186,027 B1 2/2001 Nielsen
6,220,398 B1 4/2001 Wu
2005/0012299 A1 1/2005 Schuman et al.
2005/0115777 A1 6/2005 Goring
2005/0263980 A1 12/2005 Bakhtin
2006/0119069 A1 * 6/2006 D'Aluisio et al. ........... 280/279

* cited by examiner

*Primary Examiner*—Lesley Morris
*Assistant Examiner*—Jacob Knutson
(74) *Attorney, Agent, or Firm*—Cislo & Thomas, LLP

(57) ABSTRACT

A combination bicycle fork and steering tube assembly is formed with a pair of downwardly directed, mutually converging end closure tabs that are bent over into abutment and welded together to define peripherally enclosed fork openings at the ends of the steerer tube. The upper ends of the hollow fork legs are configured to follow the surface contours of the lower end of the steerer tube and are welded to the end closure tabs about the circumferences of the enclosed fork openings at the lower end of the steering tube. The front wheel axle dropouts are formed directly in the lower ends of the fork legs, which include internal dropout support inserts. The dropout support inserts are sandwiched in between a pair of flat, mutually parallel dropout tabs defined directly in the lower ends of the fork legs.

14 Claims, 12 Drawing Sheets

24
48
22
12
10
26
30
20
28
60
34
18
52
49
14
48
51
50
54
63

24
48
22
12
10
26
30
20
28
60
34
18
52
47
14
48
51
50
54
63

101
104
100
103
31
2A
20
34
60
52
52
60
46
51
2A
18
51
50
50
54
54
84
64
84
82
82
64
64
64
70
70

58
52
50
75
70
54
74
78
66
68
76
86
64
64
84
65
65
72

58
56
52
51
50
67
54
64
65
62

7
31
20
34
32
38
40
7

76
75
78
74
70
86
82
82
72
80

11
11
10
76
78
82
86
82
80
10

9
74
76
78
75
70
86
80
82
72
9

82
72
86
74
78
76
90
72
82
70

82
65
70
54
67
67
64
72
82
50
52
38
42
58
58
38
46
60
52
16
82
70
65
72
54
67
67
64
82
50

BICYCLE FORK AND STEERING TUBE

CROSS-REFERENCES TO RELATED APPLICATIONS

This patent application is a continuation and claims the benefit of U.S. patent application Ser. No. 11/488,404 filed Jul. 19, 2006 for Bicycle Fork and Steering Tube, which application is incorporated here by this reference.

TECHNICAL FIELD

This invention relates to a bicycle fork and steering tube construction with particular application to BMX bicycles.

BACKGROUND ART

Bicycles have historically be constructed with a cylindrical steerer tube having an upper end joined to the bicycle handlebars, and a lower end to which a bicycle front wheel fork is rigidly fastened. The steerer tube is rotatable within a hollow, cylindrical head tube which forms a part of the bicycle frame and which is located at the front of the bicycle frame. The rider rotates the steerer tube by turning the handlebars to the left or right in order to turn the front wheel fork to the left or right. By altering the orientation of the front wheel relative to the bicycle frame, the rider is able to change the direction of travel of the bicycle to the left or right as desired.

Conventional bicycle fork and steering tube structures have certain disadvantages. These disadvantages are particularly pronounced in the case of BMX bicycles, in which reduced weight and reduced complexity of construction are particularly important. There are several standard bicycle front wheel fork and steerer tube structures that are widely used in different styles of BMX bicycles.

One prevalent type of bicycle front wheel fork and steerer tube combination is known as the "unicrown" fork. Bicycle forks of this type are comprised of bent tubular fork legs welded directly to the hollow, cylindrical steerer tube. In this type of bicycle fork and steerer tube construction the steerer tube is simply cut off at right angles at its lower end and the fork legs are mitered to meet the sides of the open-ended steerer tube.

The "unicrown" configuration results in a open hole at the base of the steerer tube of the finished fork. This open hole can become fouled with debris that might impede the rotation of the front bicycle wheel that rotates about the front wheel axis within the fork.

Furthermore, this structure allows for relatively large, localized deformations under loads, thus resulting in metal fatigue and ultimately metal failure. To avoid metal fatigue, heavy wall thickness is required in both the steerer tube and the fork legs. As a result, the finished bicycle front wheel fork and steering tube combination is excessively heavy.

In order to mount the front bicycle wheel between the fork legs, dropout flanges are typically welded to the lower extremities of the fork legs. These dropout flanges are formed as solid plates, castings, or forgings welded to the end or side of each fork leg.

That is, the dropout flanges project in planes parallel to each other that are both perpendicular to the plane of alignment of the legs of the bicycle fork. Due to the off center stresses that result from torque forces acting relative to the plane of alignment of the fork legs, the entire lower fork assembly, specifically the fork legs, the dropout flanges and the welds that join the dropout flanges to the lower ends of the fork legs must be very sturdy and are unduly heavy. Lighter weight dropout flanges tend to be thinner and significantly weaker than desired.

Also, in the field of BMX bicycle forks and steerer tubes it is often necessary to run a front brake cable down the center of the steerer tube in order to activate the front brake while avoiding contact between the brake cable and the frame when the steering system is rotated more than one hundred eighty degrees. The brake cable passage created conflicts with the "top bolt" which is required for setting up the headset that holds the bicycle handlebars and which bears tension.

The conventional way of routing the brake cable is to run it through the center of a hollow bolt having external hexagonal wrench flats that accommodate a wrench for tensioning the bolt. That is, the conventional hollow bolt system relies upon a large, external hexagonal configuration on a low bolt head or a smaller hex head that protrudes upwardly in an undesirable way. Another common solution to this problem is to use a hexagonal socket head located centrally in the bolt. However, with the prevalent existing standard headset sizes there is insufficient room to keep a hexagonal socket head central while running the cable eccentrically down through the hollow bolt. A common solution to this is to run the cable through the hexagonal socket itself, but this renders the socket head unusable until the brake cable has been removed. Furthermore, with the hex head top bolts most widely utilized, it is not possible to pass a brake cable assembly through intact.

Therefore, any replacement of headset parts, stem, or frame parts, generally requires a labor intensive disassembly of the front brake cable adjustment setup at the front braking caliper.

DISCLOSURE OF INVENTION

The present invention provides unique, improved construction features that remedy the deficiencies of prior bicycle front wheel fork and steering tube systems. The invention provides a bicycle with a wheel fork and steering tube assembly that has a superior, weight-reducing construction, and which reduces both weight and stress at the lower end of the steerer tube and at the lower ends of the bicycle fork legs. Moreover, a hollow preload bolt is provided that has a much larger cable routing access passageway than conventional systems.

In one broad aspect the invention may be considered to be a bicycle fork assembly comprising a hollow steerer tube having a lower end at which a headset bearing seat is formed. Diametrically opposed notches are defined in the lower end of the steerer tube.

These notches are directed concave upwardly toward the headset bearing seat. The notches thereby define a pair of downwardly directed end closure tabs therebetween. These end closure tabs narrow from proximate the head tube seat to distal extremities. The distal extremities of the enclosure tabs are bent in toward each other to meet in mutual abutment where they are rigidly secured together. As a result, the concave notches define peripherally enclosed fork openings at the lower end of the steerer tube.

A pair of hollow, tubular fork legs is provided having upper and lower ends. Each of the fork legs upper ends terminates in a steerer tube interface opening having edges that follow the surface contour of the lower end of the steerer tube. These fork leg edges surround the steerer tube openings and reside in direct contact with and are welded about their circumferences to the end closure tabs of the steerer tube. The lower ends of the fork legs terminate in bicycle axle dropouts.

By constructing the interface between the fork legs and the steerer tube in this manner, a potential snag or fouling risk is avoided by closing off the lower end of the steerer tube. Furthermore, this construction avoids the excessive weight in the steerer tube that would otherwise exist due to the extra material within the circumference of the steerer tube interface openings at the upper end of the fork legs. By trimming and forming the lower end of the steerer tube to conform to the area encompassed within the steerer tube interface openings at the upper ends of the fork legs, a smoother profile results, along with a reduction in weight of the steerer tube. The steerer tube is trimmed to remove lightly stressed material that lies within an area that is stiffened by the welded upper ends of the fork legs.

By notching the lower end of the steerer tube two downwardly projecting end closure tabs are left after trimming of the steerer tube. These tabs are permanently deformed by bending to meet each other and to meet the undersides of the upper ends of the fork legs so that the stresses in this area are smoothly guided around to the steerer tube.

Material is also left on the steerer tube to form a closed bottom to help support the welded upper ends of the fork legs.

In another broad aspect the invention may be considered to be a bicycle fork assembly comprising: a hollow steerer tube having a closed lower end with a pair of diametrically opposed fork leg openings defined therein, and a pair of hollow tubular fork legs having upper and lower ends. The upper ends of the fork legs terminate at steerer tube interface openings that completely surround the fork leg openings. The upper ends of the fork legs are welded to the lower end of the steerer tube throughout the circumference of the steerer tube interface openings.

The lower ends of each of the fork legs are preferably deformed to define a pair of flat, mutually parallel dropout tabs disposed in spaced separation from each other and with dropout notches defined therein. Corresponding downwardly converging interior wall surfaces are also defined above the dropout tabs. A dropout support insert is provided that has a lower dropout reinforcement portion sandwiched in between the dropout tabs. The dropout support insert also has an upper brace portion that follows the contours of the converging interior wall surfaces of the fork legs.

With the construction of the present invention in which the dropouts are formed directly in the lower ends of the tubular fork legs, a considerable reduction of weight is achieved. Moreover, by forming the dropouts in the lower ends of the fork legs so they are on the axis of the leg tubing, undesirable torsional stresses and other stresses on the fork legs are minimized. The dropout support insert that is employed extends up inside the fork leg to brace the dropout to the tubular portion of the fork leg above it, while also providing support against damage and crushing. The construction of the dropout directly in the lower end of each fork leg allows the dropouts to be substantially thicker, therefore more resistant to bending, while avoiding the addition of a large amount of excess weight to the bicycle fork and steering tube assembly.

In still another aspect the invention may be considered to be a bicycle fork assembly comprising: a hollow steerer tube having a lower end and an internally threaded upper end, a pair of hollow, tubular fork legs having upper ends joined to the lower end of the steerer tube in diametric opposition to each other and lower ends that are configured to form axle dropout slots, and a hollow, cylindrical, annular preload bolt. The preload bolt has an outer barrel with external threads thereon for engagement with the internally threaded upper end of the steerer tube. The preload bolt has an interior dividing wall that defines an upwardly facing wrench socket radially offset from axial alignment with the external threads on the barrel. A brake cable routing passage is thereby delineated from the socket within the barrel.

A driving wrench, usually one that is hexagonal in shape, may be engaged in the radially offset wrench socket to rotate the preload bolt to tighten or loosen it from the upper end of the steerer tube. By locating the socket off center the cross-sectional area of the cable routing passageway through the hollow preload bolt is increased substantially, and therefore the weight of the preload bolt is reduced. Furthermore, this increased cable passageway allows the preload bolt to be fully removed without disconnecting the bicycle brake cable from the front brake caliper adjustment assembly.

By configuring the hex socket off center from the axis of alignment of the preload bolt, it is possible to create a much wider brake cable routing passage through the preload bolt than is possible in conventional preload bolt designs. This provides space for the brake cable to easily pass through the large brake cable routing opening next to the hexagonal wrench socket. As a result, the hexagonal socket is never blocked and can be the sole means of adding bolt tension. Because the external wrench flats are no longer required, this construction allows the outer profile of the bolt to be much lower and smoother. Furthermore, the brake cable routing passage can be large enough to accept the larger parts of the brake cable assembly so that servicing and part replacement can be preformed without disassembling the brake cable assembly from the front brake caliper.

The invention may be described with greater clarity and particularity by reference to the accompanying drawings.

BEST MODE FOR CARRYING OUT THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
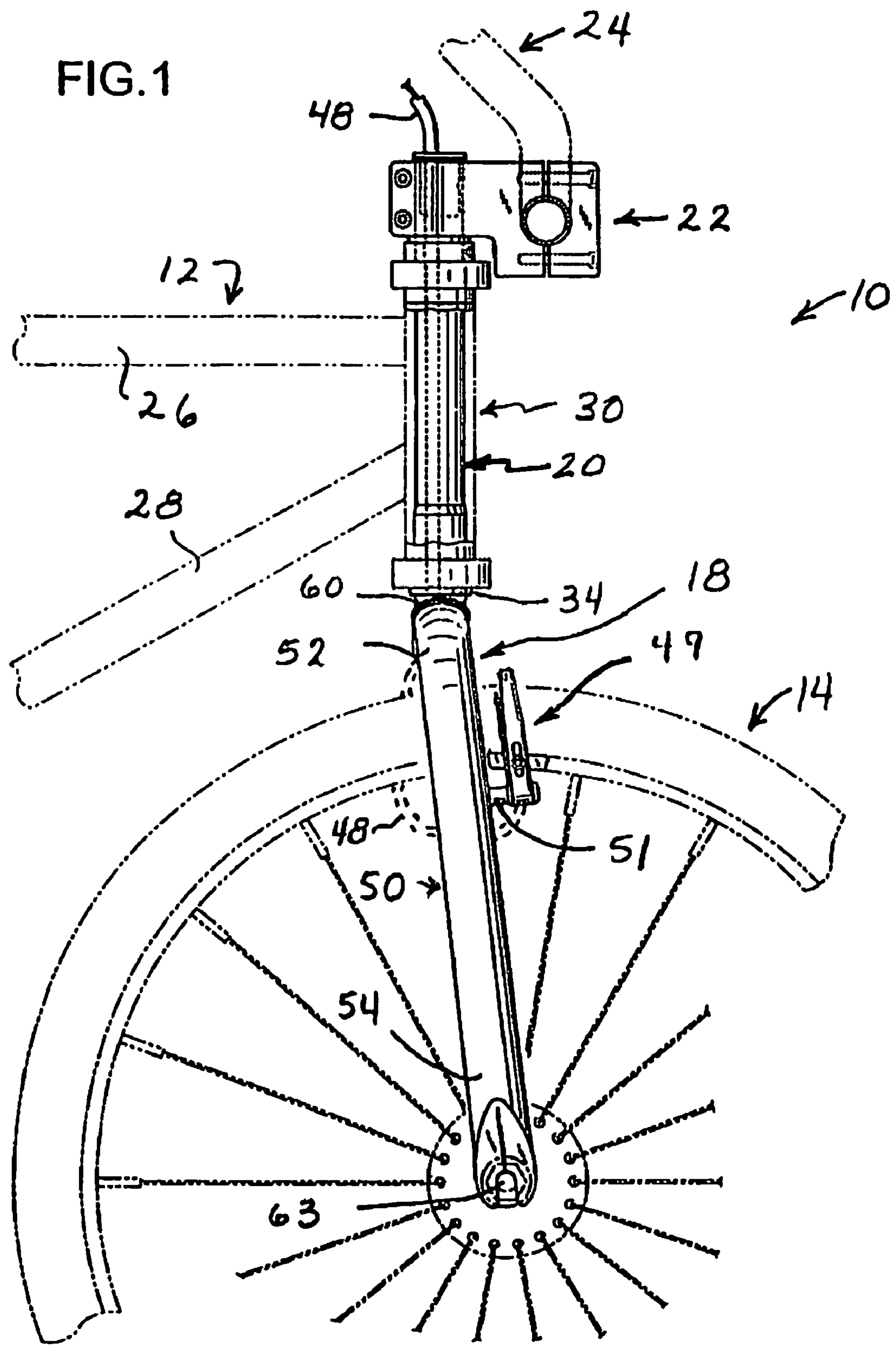
FIG. 1 is a side elevational view illustrating the combination of a bicycle front wheel fork and steering tube of the invention as mounted in position on a bicycle.
Figure 2:
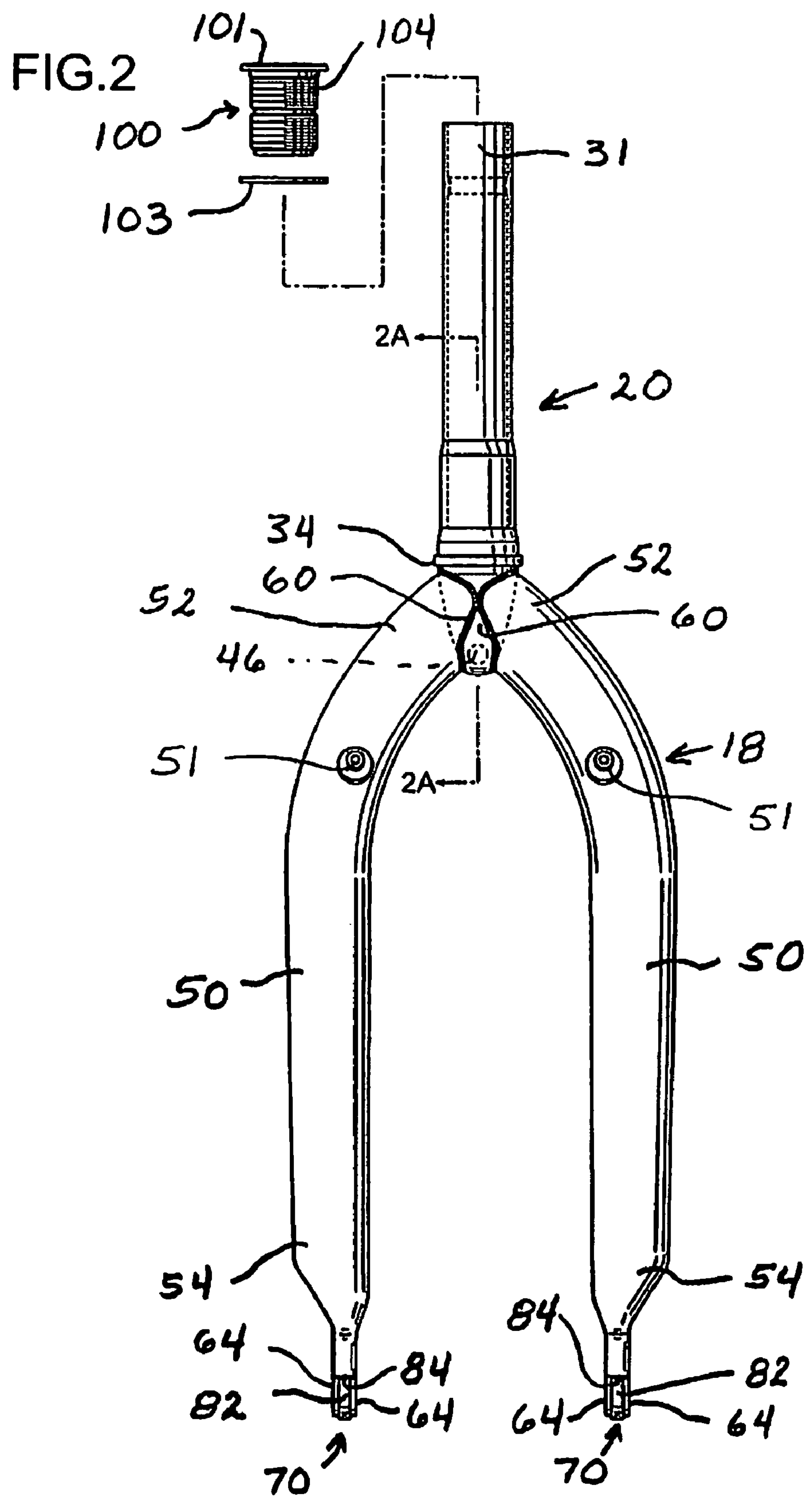
FIG. 2 is an exploded, front elevational view of the bicycle fork and steering tube assembly of the invention.

FIG. 1 illustrates the front portion of a BMX bicycle 10, which includes a conventional bicycle framework illustrated partially in phantom at 12, a front bicycle wheel illustrated in phantom at 14, and the combination of a bicycle fork and steering tube assembly indicated generally at 16 in FIG. 2. The assembly 16 includes a bicycle front wheel fork 18 and a steerer tube 20, both shown in FIG. 2. As in conventional BMX bicycles a clamping stem assembly 22 is provided to secure the bicycle steerer tube 20 to the bicycle handlebars, indicated in phantom at 24.

The bicycle frame 12 is formed of tubular, rigid members including fore and aft frame members 26 and 28 which are welded to an upright bicycle frame head tube 30. The bicycle frame head tube 30 is a hollow, cylindrical structure that receives the bicycle steerer tube 20 coaxially therewithin. The bicycle steerer tube 20 is freely rotatable within the laterally surrounding confines of the frame head tube 30.

The structure of the bicycle fork and steering tube assembly 16 is illustrated in detail in FIGS. 2 through 12. As illustrated in FIGS. 2, 2A, 3, 6, 7, and 12, the bicycle fork assembly 16 is formed of the hollow steerer tube 20 that has an internally threaded upper end 31 and a lower end 32 at which a radially outwardly protruding headset bearing seat 34 is formed.

Figure 7:
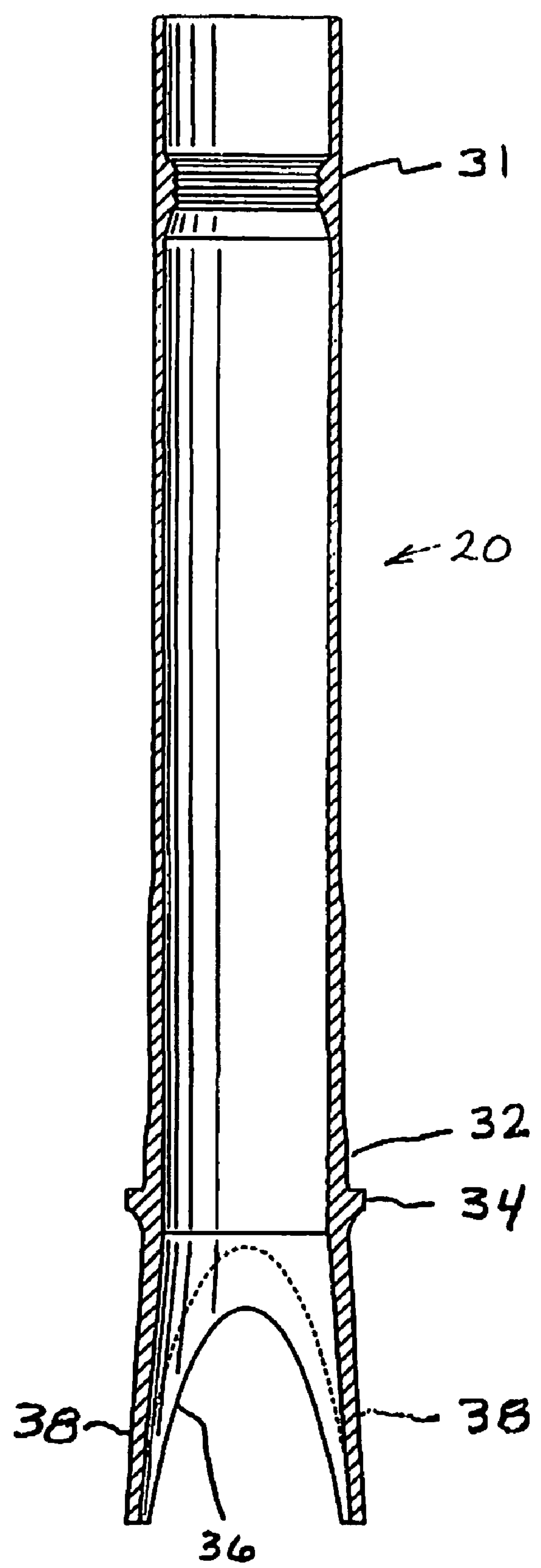
FIG. 7 is a side sectional view showing the bicycle steering tube in isolation and prior to deformation of the dropout tabs thereof.
Figure 8:
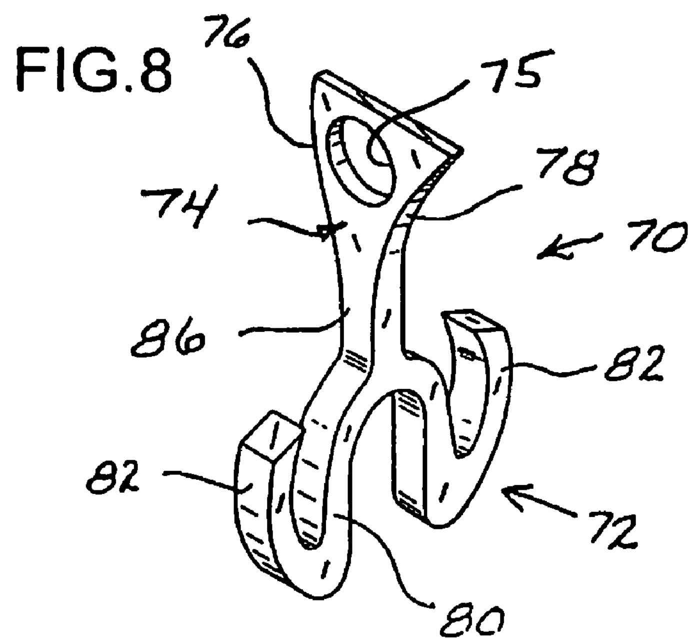
FIG. 8 is a perspective view showing the dropout support insert of the invention in isolation.
Figure 9:
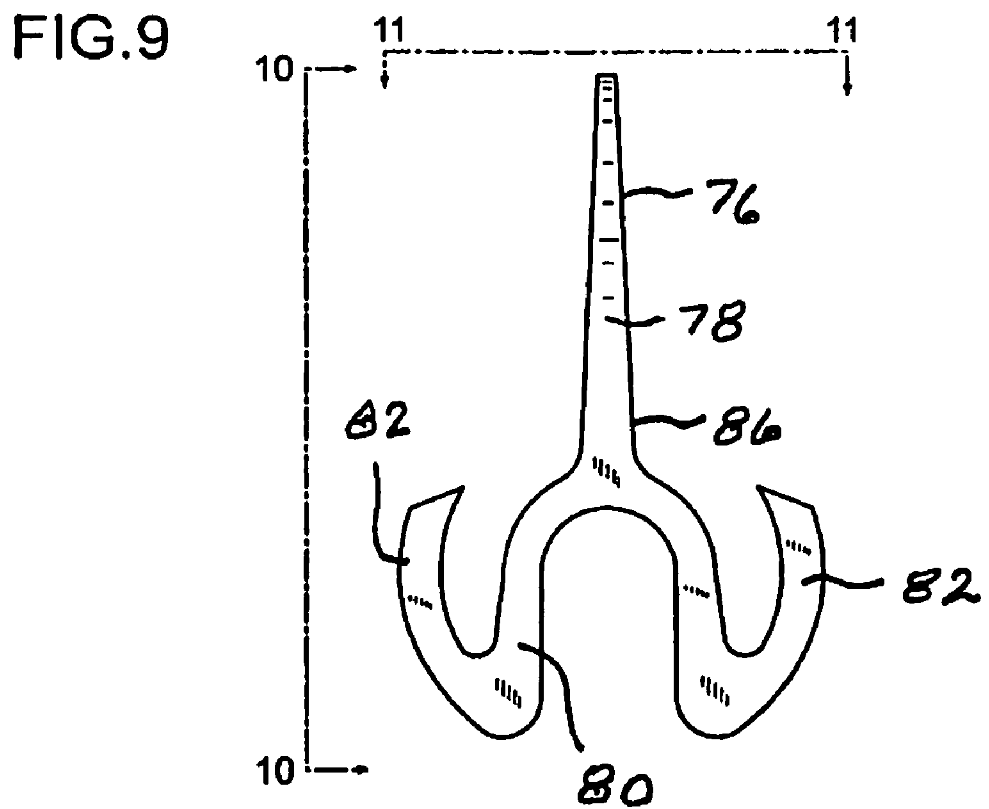
FIG. 9 is a side elevational view of the dropout support insert shown FIG. 8.
Figure 10:
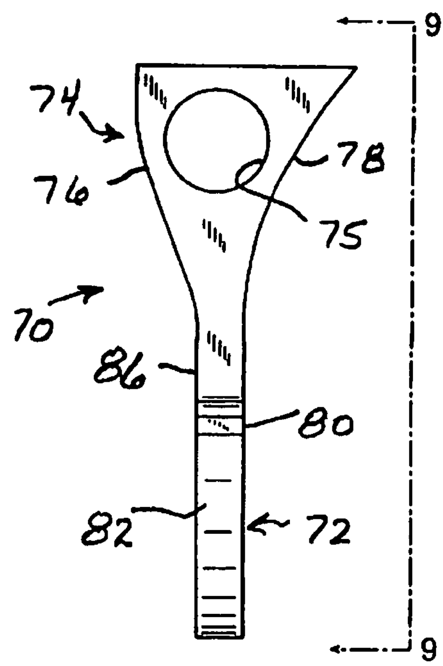
FIG. 10 is a front elevational view of the bicycle dropout insert taken along the lines 10-10 in FIG. 9.

As shown in FIG. 7, a pair of diametrically opposed notches 36 is defined in the lower end 32 of the steerer tube 20. The notches 36 are directed concave upwardly toward the headset bearing seat 34 and have a generally parabolic shape, as illustrated in FIG. 7. The notches 36 thereby define a pair of downwardly directed end closure tabs 38 therebetween.

Figure 2A:
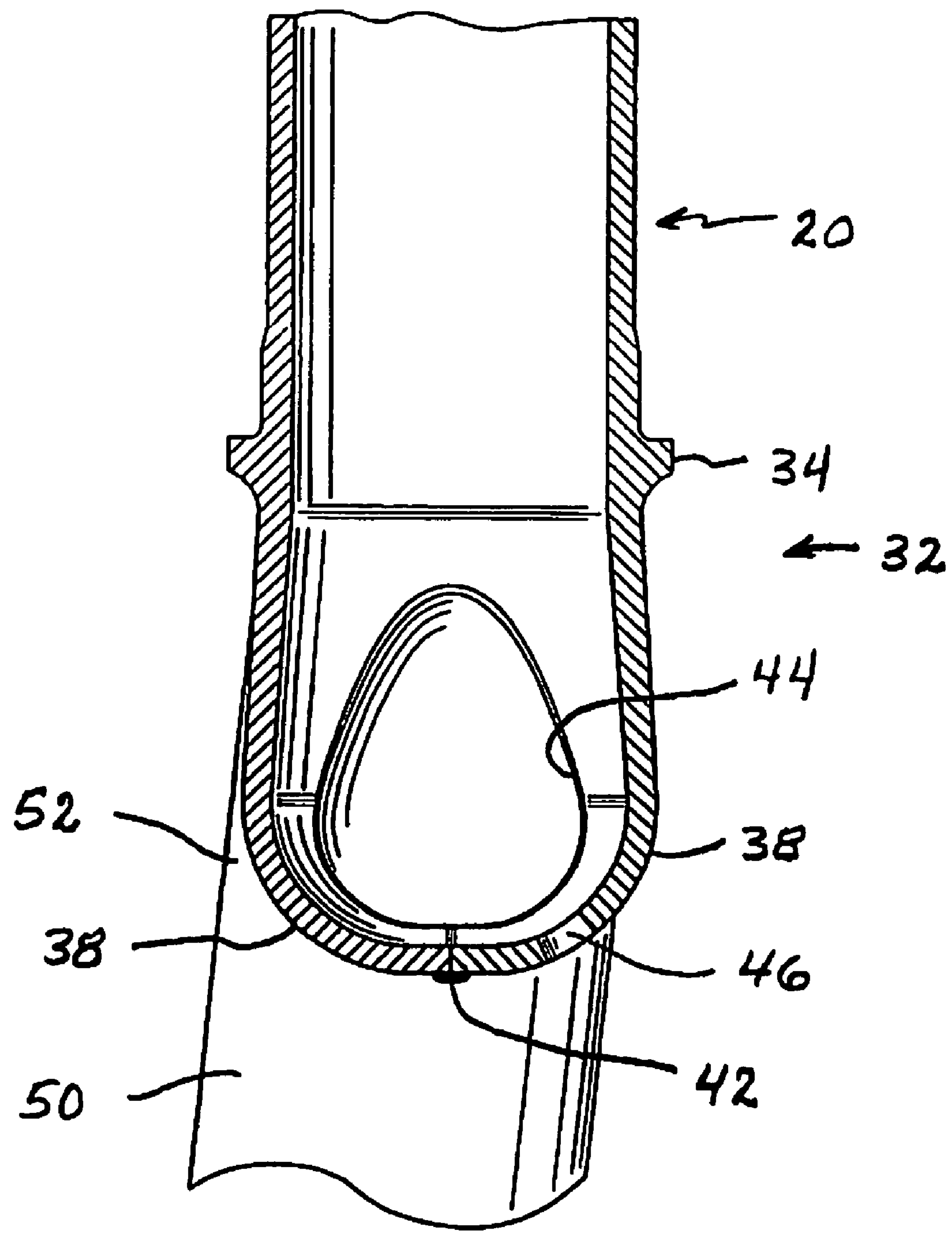
FIG. 2A is a sectional elevational detail taken along the lines 2A-2A in FIG. 2.
Figure 6:
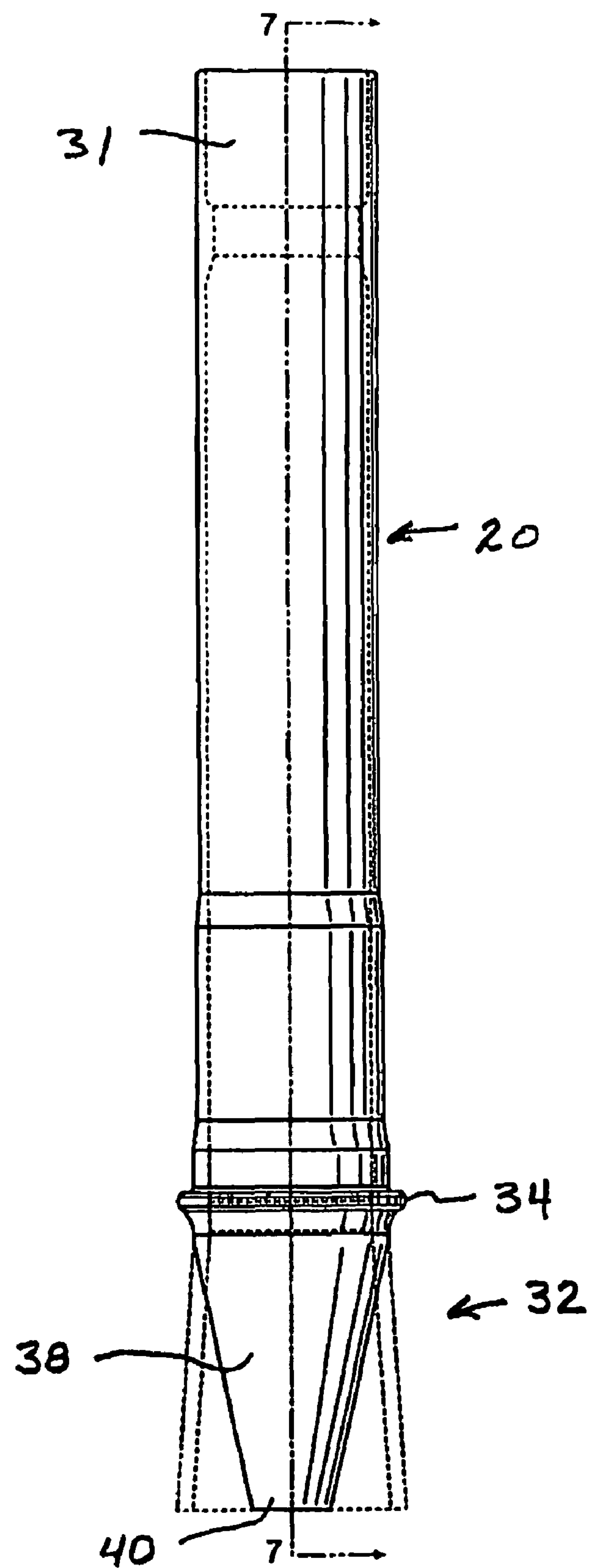
FIG. 6 is a front elevational view illustrating the bicycle steering tube shown in isolation.
Figure 12:
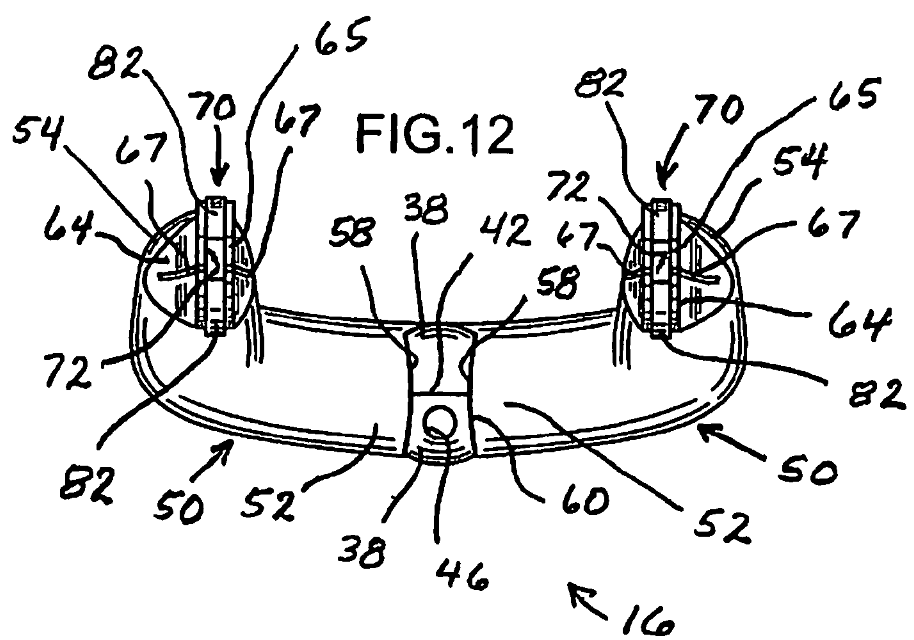
FIG. 12 is a bottom plan view of the bicycle fork and steering tube assembly of the invention.

As illustrated in FIG. 6, the end closure tabs 38 narrow from proximate the headset bearing seat 34 to distal extremities 40. In the finished construction the distal extremities 40 of the end closure tab 38 are bent in toward each other to meet in mutual abutment as indicated at the demarcation 42 therebetween in FIGS. 2A and 12. The distal extremities 40 of the enclosure tabs 38 are rigidly secured together by welding where they meet at 42, as illustrated in FIG. 12 and in FIG. 2A. As illustrated in drawing FIG. 2A, when the enclosure tabs 38 are bent in toward each other to meet in mutual abutment, the notches 36 are closed at their lower ends to define a pair of peripherally enclosed, generally tear-shaped fork openings 44 at the lower end 32 of the steerer tube 20. Also as shown in FIG. 2A, a front brake cable access aperture 46 is drilled through one of the end closure tabs 38 after the end closure tabs 38 are bent into abutment and welded together.

The front brake cable access aperture 46 is defined through the curved wall structure of one of the end closure tabs 38 of the steerer tube 20. The brake cable access aperture 46 permits the lower end of the bicycle brake cable 48, shown in FIGS. 1 and 13, to exit the lower end 32 of the steerer tube 20. The lower end of the brake cable 48 is operatively connected to a front brake assembly 49 as shown in FIG. 1. The front brake assembly 49 is mounted upon brake mounting pins 51. The front brake assembly 49 may be any conventional caliper brake assembly. It may be a brake assembly such as that described, for example, in U.S. Pat. No. 6,019,522, which is hereby incorporated by reference in its entirety. The bicycle brake cable 48 is omitted from FIG. 2A so as to allow clearer illustration of the junction of the front wheel fork 18 with the steerer tube 20.

The bicycle front wheel fork 18 is formed by a pair of elongated, hollow, tubular steel legs 50. The tubular fork legs 50 are configured in mirror image relative to each other. The fork legs 50 each have an upper end 52 and a lower end 54. Each of the fork leg upper ends 52 terminates in a steerer tube interface opening 56, indicated in FIG. 5.

The edges 58 at the upper end 52 of each fork leg 50 follow the surface contour on the outer, curved surfaces of the end closure tabs 38 at the lower end 32 of the steerer tube 20.

Figure 3:
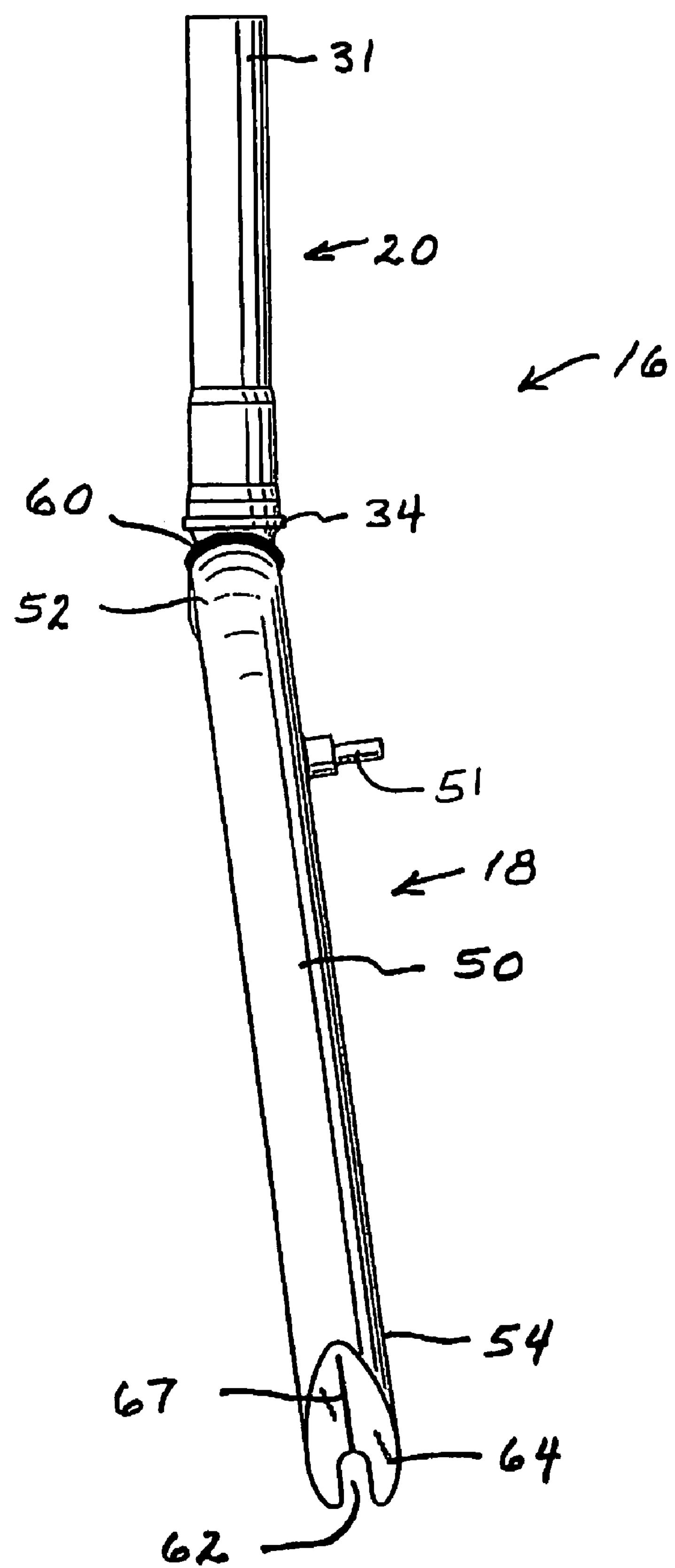
FIG. 3 is a side elevational view of the bicycle fork and steering tube of the invention.

The edges 58 that define the steerer tube interface openings 56 reside in direct contact with and are welded about their circumferences to the end closure tabs 38 of the steerer tube 20, as indicated by the weld lines 60 shown in FIGS. 2, 3, and 12.

Figure 4:
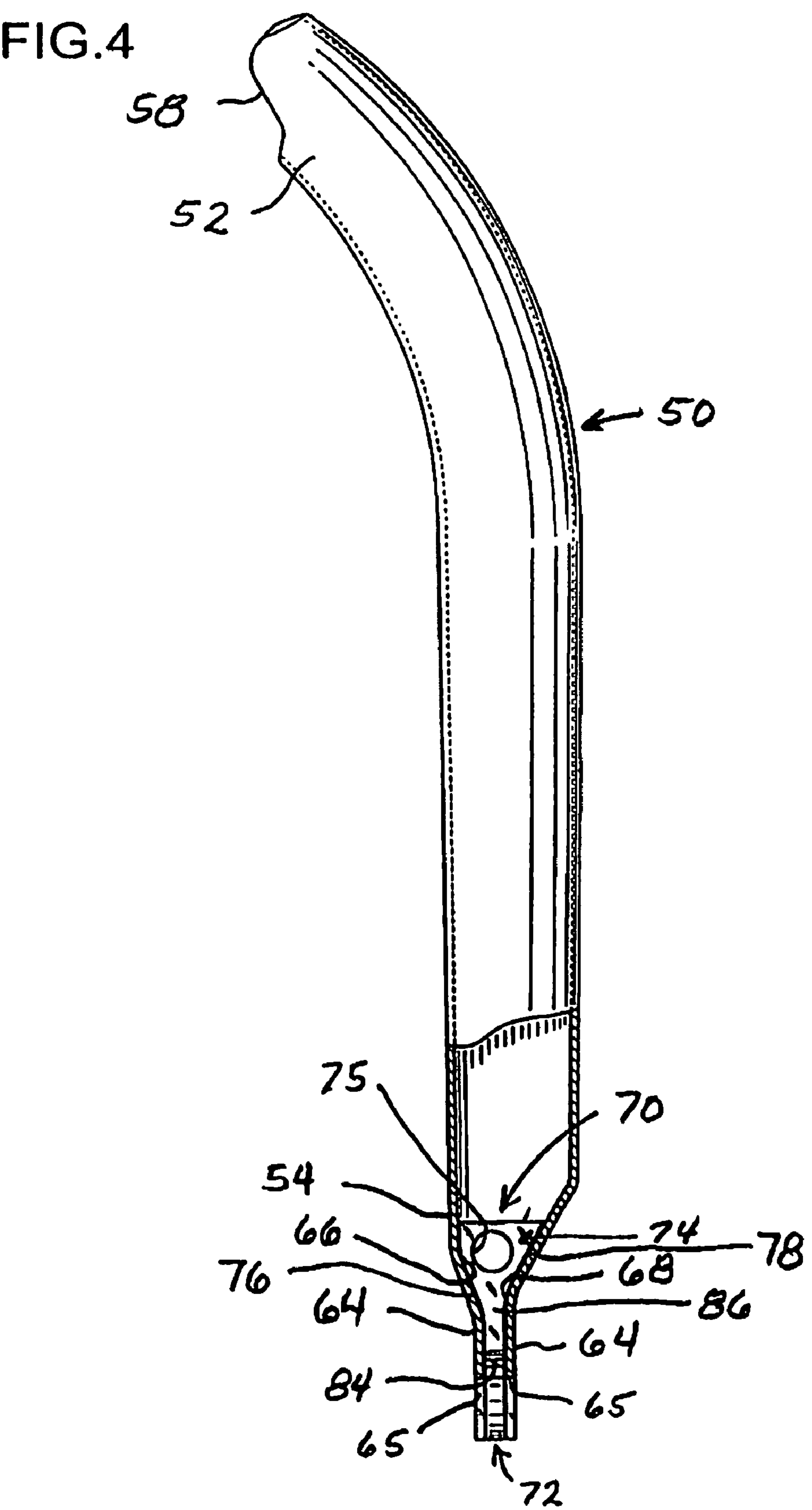
FIG. 4 is a front elevational view, partially broken away, of a single one of the bicycle fork legs employed in the invention.
Figure 5:
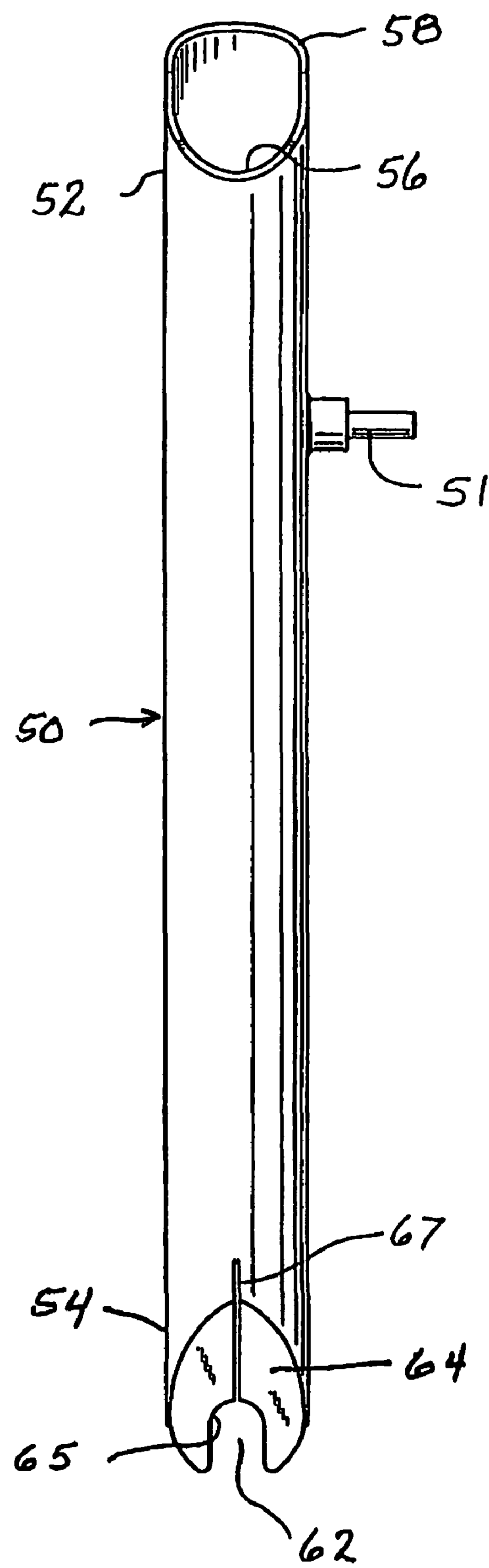
FIG. 5 is an inside side elevational view showing the bicycle fork leg of FIG. 4 in isolation.

The lower ends 54 of each of the fork legs 50 terminate in bicycle axle dropout slots 62. As illustrated in FIG. 4, the lower ends 54 of each of the fork legs 50 are permanently deformed to define a pair of flat, mutually parallel dropout tabs 64. U-shaped dropout notches 65 are defined in the dropout tabs 64. As shown in FIG. 4, the lower ends 54 of the fork legs 50 are bent to form corresponding downwardly converging interior wall surfaces 66 and 68 above the dropout tabs 64.

A dropout support insert 70, illustrated in isolation in FIGS. 8 through 11, is disposed within each of the lower ends 54 of each fork leg 50. Each dropout support insert 70 has a lower reinforcement portion 72 sandwiched in between the dropout tabs 64 and an upper brace portion 74 that has inboard and outboard surfaces 76 and 78, respectively. The surfaces 76 and 78 follow the contours of the converging interior fork leg wall surfaces 66 and exterior fork leg wall surfaces 68, respectively, of the lower ends 54 of the fork legs 50.

The lower reinforcement portion 72 of each dropout support insert 70 is configured as a flat, yoke-shaped structure having a central, inverted U-shaped region 80 that conforms to the shape of the dropout notches 65. Upturned feet 82 reside in abutment against the edges 84 that are located between the spaced apart dropout tabs 64 at the lower ends 54 of the fork legs 50. The upturned feet 82 extend upwardly and in opposite directions from the inverted, U-shaped section 80 and reside in abutment against the lower edges 84 between the dropout tabs 64 in the lower fork leg ends 54. The upper, brace portion 74 of each dropout support insert 70 resides in abutment against the converging interior wall surfaces 66 and 68 in the lower ends 54 of the fork legs 50 above the dropout tabs 64 thereof. To reduce weight a hole 75 is formed in the upper brace portion 74.

The dropout support insert 70 is further comprised of a stem 86 that extends between the lower reinforcement portion 72 and the upper brace portion 74 of each dropout support insert 70. The brace portion 74 has opposed upwardly diverging fork leg contact edges 76 and 78 that are aligned in a plane

Figure 11:
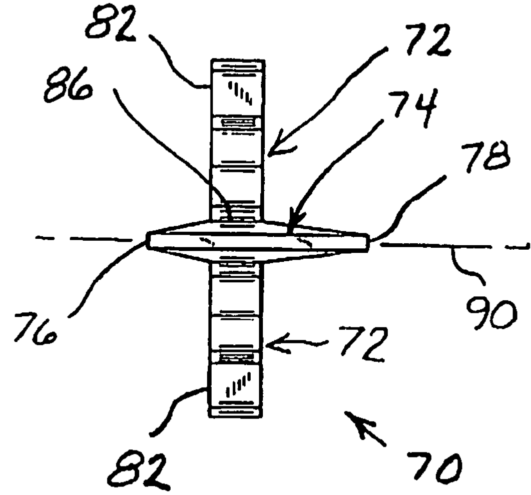
FIG. 11 is a top plan view of the bicycle dropout insert taken along the lines 11-11 in FIG. 9.

90, indicated in FIG. 11, that is oriented at right angles to the flat, yoke-shaped structure of the lower reinforcement portion 72, as illustrated in FIG. 11.

Narrow slits 67 are defined in each of the lower ends 54 of the fork legs 50 extending upwardly from the dropout notches 65 formed in the dropout tabs 64. The slits 67 are present to more readily allow deformation of the lower ends 54 of the fork legs 50 to create the mutually parallel dropout tabs 64. The slits 67 also allow the legs to be welded to the inserts 70 along these lines to consolidate the structure. The dropout support inserts 70 are installed in position in the lower ends 54 of the fork legs 50 prior to deformation of the lower fork leg ends 54 to create the dropout tabs 64. The lower ends 54 of each of the fork legs 50 are permanently deformed to define the pair of flat, mutually parallel tabs 64 disposed in spaced separation from each other. The edges 76 and 78 of the upper, brace portion 74 of the dropout support inserts 70 are aligned with the slits 67.

Once the lower ends 54 have been deformed so that the dropout tabs 64 are pressed against the opposing flat surfaces of the yoke-shaped lower dropout reinforcement portion 72, the lower reinforcement portion 72 of the dropout support insert 70 is welded to the dropout tabs 64 at the lower ends 54 of the fork legs 50. The lower ends 54 are also welded so that weld material flows into the slits 67 to create a welded surface between the inboard and outboard edges 76 and 78 of the upper brace portion 74 of the dropout inserts 70 and the curved, interior wall surfaces 66 and 68 of the lower ends 54 of the fork legs 50.

The lower dropout reinforcement portion 72 of the dropout insert 70 is sandwiched in between and welded to the dropout tabs 64. The inboard and outboard edges 76 and 78, respectively, of the upper brace portion 74 of the dropout insert 70 follow the contours of the converging interior wall surfaces 66 and 68, respectively.

The bicycle fork and steering tube assembly 16 of the invention is provided with a preload bolt 100 at the upper end of the steerer tube 20. The preload bolt 100 is a hollow, cylindrical, annular structure that has an outer barrel 102 with external threads 104 defined thereon for engagement with the conventional internally threaded upper end 31 of the steerer tube 20.

The upper end of the hollow, preload bolt 100 terminates in a narrow, radially outwardly directed flange 101. The barrel portion 102 of the preload bolt 100 passes through the central, axial opening of a preload washer 103 so that the threads 104 on the exterior wall surface of the preload bolt 100 are inserted into the hollow, central structure of the upper end 31 of the steerer tube 20. As the preload bolt 100 is tightened, the preload washer 103 is compressed between the stem 22 and the flange 101 at the top of the preload bolt 100.

Figure 13:
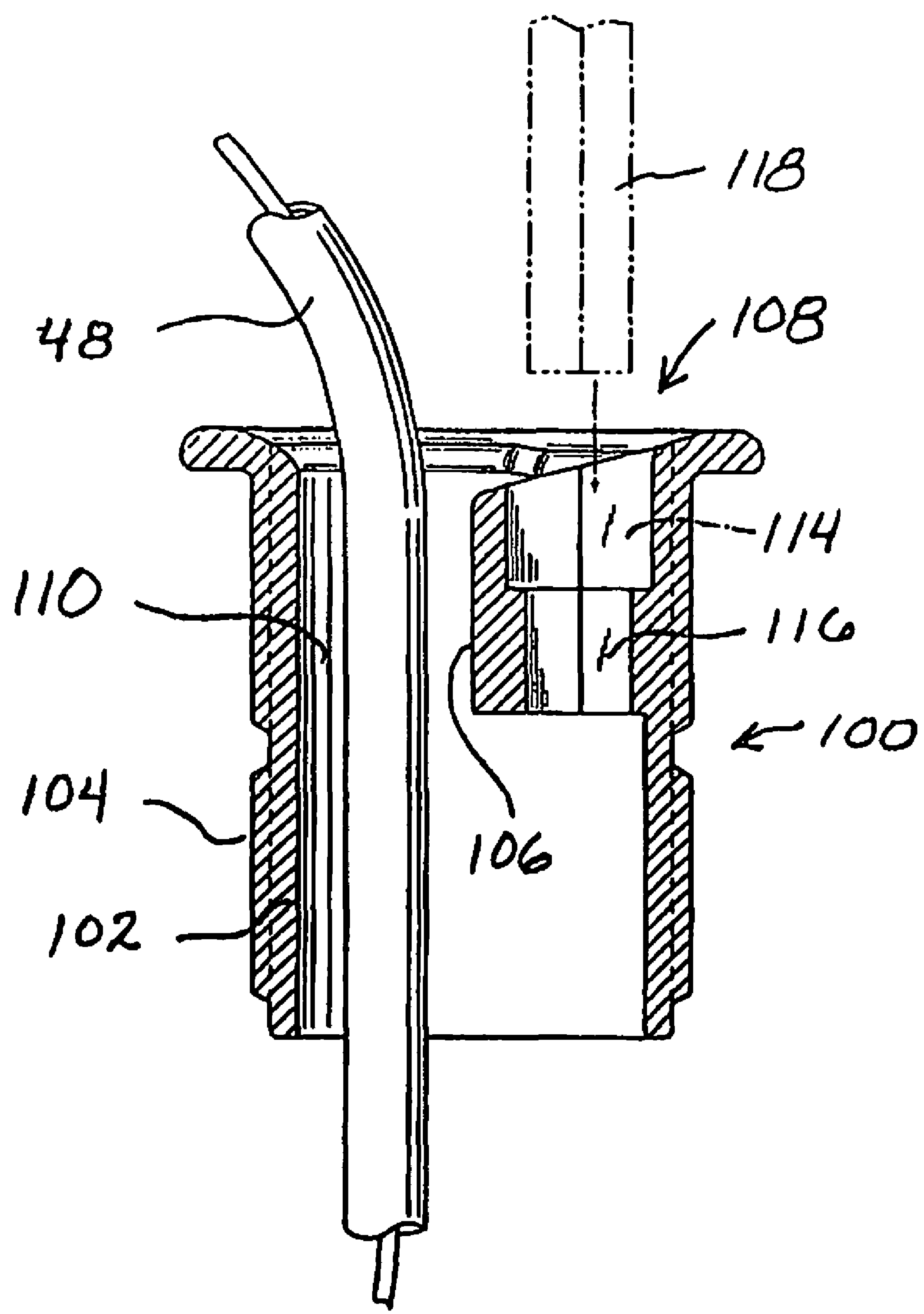
FIG. 13 is a sectional elevational view of the hollow, cylindrical, annular preload bolt employed in the invention.
Figure 14:
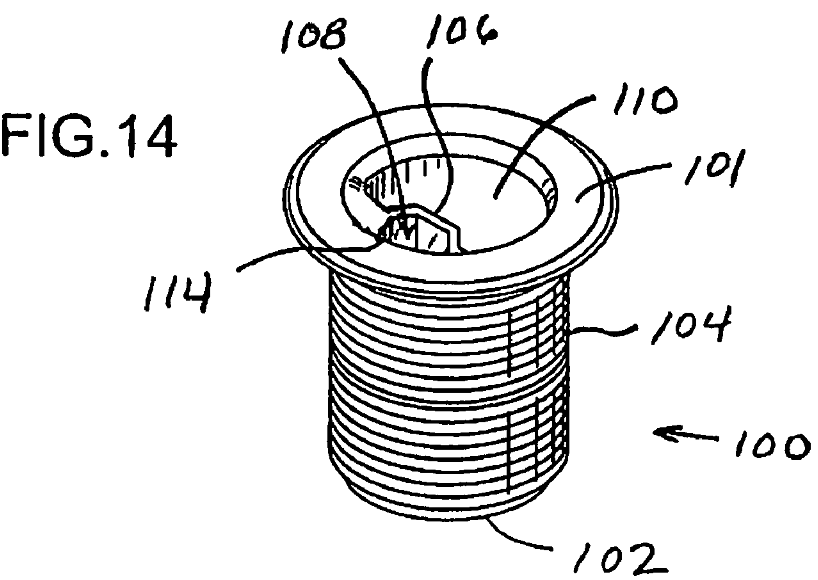
FIG. 14 is a perspective view showing the preload bolt of the invention in isolation.
Figure 15:
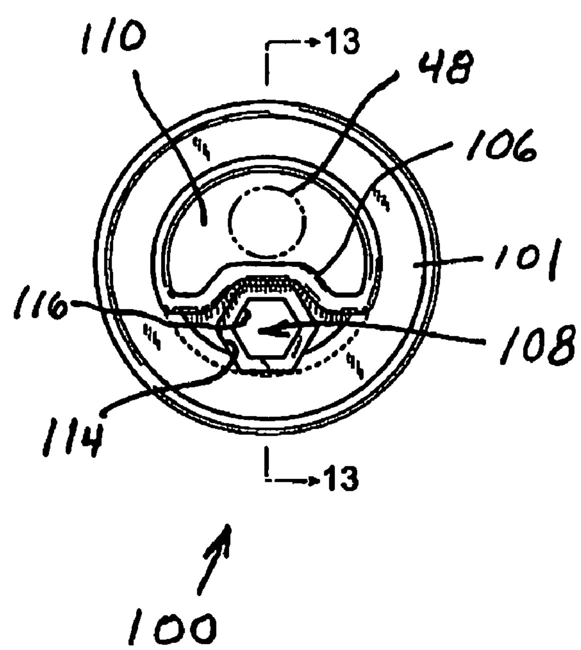
FIG. 15 is a top plan view of the bicycle preload bolt shown in FIG. 14.
Figure 16:
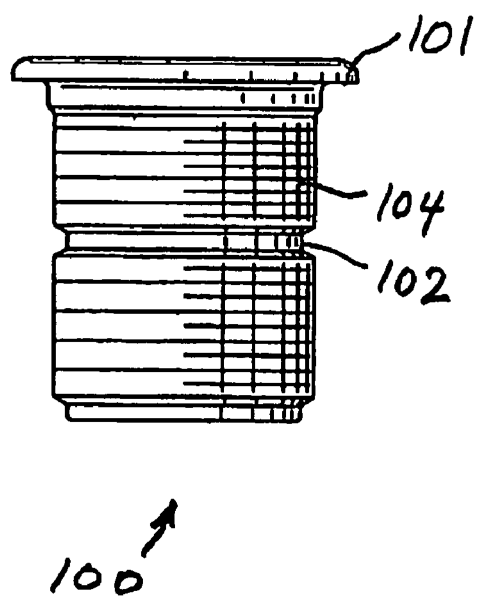
FIG. 16 is a side elevational view of the bicycle preload bolt of the invention.

The preload bolt 100 is provided with an interior dividing wall 106 that defines an upwardly facing wrench socket 108, as shown in FIGS. 13 through 15. The wrench socket 108 is radially offset from axial alignment with the external threads 104 on the preload bolt barrel 102 so as to delineate a relatively large brake cable routing passage 110 within the hollow preload bolt 100.

As illustrated in FIG. 13, the wrench socket 108 defines an upper hexagonal region 114 and a lower hexagonal region 116 of smaller cross-sectional area than the upper hexagonal region 114. The upper and lower regions 114 and 116 of the socket 108 accommodate different sizes of hex head wrenches, one of which is indicated in phantom at 118 in FIG. 13. For example, the upper hexagonal-shaped socket region 114 may accommodate an eight millimeter hex head wrench 118, while the lower hexagonal-shaped socket region 116 may accommodate a smaller hex head wrench, such as a six millimeter wrench 118.

As is evident from FIG. 15, the vertical tip of a hex head wrench 118 can be inserted down into the appropriate size socket region 114 or 116. As is evident from FIGS. 13 through 15, the hex head wrench 118 can be used to rotate the hollow preload bolt 100 about the axial center of the preload bolt 100. The hex head wrench 118 is used to rotate the preload bolt 100 about its own axis so that the socket 108 travels in an orbital path about the axis of the preload bolt barrel 102 as the preload bolt 100 is tightened or untightened.

Due to the creation of the relatively large brake cable routing passage 110 that is defined longitudinally through the structure of the preload bolt 100 by the interior dividing wall 106, the entire preload bolt 100 can be rotated to tighten it or loosen it relative to the upper end 31 of the steerer tube 20 without disturbing the front bicycle brake cable 48. That is, as the preload bolt 100 is rotated to tighten it into the upper end 31 of the steerer tube 20, the socket 108 is moved in an orbital, clockwise path, as viewed in FIG. 15, yet the front bicycle brake cable 48 is not rotated, but merely moves laterally in an orbital path opposite the path of movement of the socket 108. As a consequence, the preload bolt 100 can be tightened and loosened without disturbing the end connections of the front bicycle cable 48.

The bicycle fork and steering tube combination 16 of the present invention provides significant advantage over conventional structures. By forming the peripherally enclosed fork openings 44 at the lower end 32 of the steerer tube 20, material is removed and weight is saved in the construction of the steerer tube 20. This is accomplished without weakening the structure of the steerer tube 20, since the material removed at the notches 36 does not bear any great load. Furthermore, the closed-off end of the steerer tube is thinner in section. However, due to its closed shape it is less prone to distortion than a customary open-ended round tube. Therefore this thinner closed-off section can withstand higher stresses with less distortion, while saving weight.

By providing the dropout slot 62 for the front wheel axle 63 directly in the structure of the lower ends 54 of the fork legs 50, material is saved since no dropout mounting flanges are required. Moreover, the system avoids torsional stresses created by the offset between the fork leg tube axis and the axle position that would otherwise exist when separate dropout flanges, offset from the tube axis, are employed.

Additionally, by employing a tightening socket 108 radially offset from the axis of alignment of the preload bolt 100, a much larger bicycle brake cable routing passage 110 can be defined through the hollow bolt 100. Furthermore, the weight of providing external wrench flats on the preload bolt flange 101 is avoided, thus allowing a significant weight reduction for the preload bolt 100. Moreover, the radially offset location of the hex head wrench socket 108 permits a brake cable routing passage 110 of much greater cross-sectional area to be formed in the preload bolt 100 than would otherwise be possible. This larger passageway also allows for a significant amount of weight to be saved.

A further benefit of the new design of the invention is that the preload bolt can be completely removed from the fork steerer tube after the brake cable lever lug has been unseated from the front brake lever. This is a simple step that can usually be accomplished without tools. The preload bolt can then slide easily up and over the large brake cable lever lug because of the unusually large cable passageway through the bolt. At this point disassembly and removal of the other bicycle components (stem, headset, frame, fork, etc.) is more easily managed. With most traditional preload bolts, the lack of a large cable passageway means that the cable has to be disassembled at the brake caliper. This means that the user will have to lose all previous adjustment on the front brake caliper in order to pull the small "lugless" caliper-end of the cable up through the steerer tube and out from the conventional preload bolt to allow for the general removal or disassembly of the other bicycle components in this area.

With both the new design and conventional designs basic brake adjustment can be made without disconnecting the brake. The major difference between the prior art and the present invention is the area of cable disconnection when it comes to fully removing the preload bolt and thus the other components from the steering system of the bicycle.

Undoubtedly, numerous variations and modifications of the present invention will become readily apparent to those familiar with bicycle construction. For example, dropout support inserts of varying geometric shapes can be employed in place of the preferred embodiment of the dropout support insert 70 illustrated and described. Accordingly, the scope of the invention should not be construed as limited to the specific embodiment described herein, but rather is defined in the claims appended hereto.

INDUSTRIAL APPLICABILITY

This invention may be industrially applied to the development, manufacture, and use of bicycle forks and steering tubes with particular application to BMX bicycles.

What is claimed is:

1. A bicycle fork assembly comprising:

(a) a hollow steerer tube having a lower end at which a head tube seat is formed, and with diametrically opposed notches defined in said lower end and directed concave upwardly toward said head tube seat, thereby defining a pair of downwardly directed end closure tabs therebetween that narrow from proximate said head tube seat to distal extremities, and said distal extremities of said end closure tabs are bent in toward each other to meet in mutual abutment where they are rigidly secured together, so that said notches define peripherally enclosed fork openings at said lower end of said steerer tube; and (b) a pair of hollow tubular fork legs having upper and lower ends, and each of said fork leg upper ends terminates in a steerer tube interface opening having edges that follow the surface contour of said lower end of said steerer tube and which surround said fork leg openings and reside in direct contact with and are welded about their circumferences to said end closure tabs of said steerer tube, and said lower ends of said fork legs terminate in bicycle axle dropouts, wherein said lower ends of each of said fork legs are permanently deformed to define a pair of flat, mutually parallel dropout tabs with dropout notches defined therein, and corresponding downwardly converging interior wall surfaces above said dropout tabs, and further comprising a dropout support insert that has a lower reinforcement portion sandwiched in between said dropout tabs, and an upper brace portion that follows the contours of said converging interior wall surfaces of said lower ends of said fork legs, wherein said lower dropout reinforcement portion of said dropout support insert is configured as a flat, yoke-shaped structure having a central, inverted U-shaped region that conforms to the shape of said dropout notches and upturned feet that extend upwardly and in opposite directions from said inverted U-shaped region, and which reside in abutment against said lower ends of said fork legs between said dropout tabs.

2. A bicycle fork assembly according to claim 1, wherein each peripherally enclosed fork opening is generally tear-shaped.

3. A bicycle fork assembly according to claim 1, wherein said distal extremities of said end closure tabs are welded together.

4. A bicycle fork assembly according to claim 1, wherein a front brake cable access aperture is defined through one of said end closure tabs.

5. A bicycle fork assembly according to claim 1, wherein said dropout support insert is further comprised of a stem extending between said reinforcement portion and said upper brace portion, and said upper brace portion has opposed upwardly diverging fork leg contact edges that are aligned in a plane oriented at right angles to said flat yoke-shaped structure.

6. A bicycle fork assembly according to claim 1, wherein the fork leg opening is generally tear-shaped.

7. A bicycle fork assembly comprising:

(a) a hollow steerer tube having a closed lower end with a pair of diametrically opposed fork leg openings defined therein; and (b) a pair of hollow tubular fork legs having upper and lower ends, and said upper ends of said fork legs terminate in steerer tube interface openings that completely surround said fork leg openings, and said upper ends of said fork legs are welded to said lower end of said steerer tube throughout the circumferences of said steerer tube interface openings, wherein said lower ends of each of said fork legs are permanently deformed to define a pair of flat, mutually parallel dropout tabs disposed in spaced separation from each other and with dropout notches defined therein, and corresponding downwardly converging interior wall surfaces above said dropout tabs, and further comprising a dropout support insert that has a lower dropout reinforcement portion sandwiched in between said dropout tabs, and an upper brace portion that follows the contours of said converging interior wall surfaces, wherein said lower dropout reinforcement portion of said dropout support insert is configured as a flat, yoke-shaped structure having a central, inverted U-shaped region that conforms to the shape of said dropout notches and upturned feet that extend upwardly and in opposite directions from said inverted U-shaped region, and which reside in abutment against said lower ends of said fork legs between said dropout tabs.

8. A bicycle fork assembly according to claim 7, wherein said dropout support insert is further comprised of a stem extending between said reinforcement portion and said upper brace portion, and said upper brace portion has opposed upwardly diverging fork leg contact edges that are aligned in a plane oriented at right angles to said flat yoke-shaped structure.

9. A bicycle fork assembly according to claim 7, wherein each of said dropout support inserts are housed entirely within said lower ends of each of said respective fork legs.

10. A method of constructing a bicycle fork assembly, comprising:

(a) providing a hollow steerer tube having a lower end at which a head tube seat is formed;

(b) creating diametrically opposed notches in said lower end and directed concave upwardly toward said head tube seat, thereby defining a pair of downwardly directed end closure tabs therebetween that narrow from proximate said head tube seat to distal extremities;

(c) bending said distal extremities of said end closure tabs toward each other to meet in mutual abutment;

(d) securing together said distal extremities so that said notches define peripherally enclosed fork openings at said lower end of said steerer tube;

(e) providing a pair of hollow tubular fork legs having upper and lower ends, and each of said fork leg upper ends terminating in a steerer tube interface opening having edges that follow the surface contour of said lower end of said steerer tube and which surround said fork leg openings and reside in direct contact with their circumferences;

(f) securing said end closure tabs of said steerer tube about said respective hollow tubular fork leg;

(g) permanently deforming said lower ends of each of said fork legs to define a pair of flat, mutually parallel dropout tabs with dropout notches defined therein, and corresponding downwardly converging interior wall surfaces above said dropout tabs;

(h) providing a dropout support insert that has a lower reinforcement portion and an upper brace portion that follows the contours of said converging interior wall surfaces of said lower ends of said fork legs; and (i) sandwiching said dropout support insert in between said dropout tabs, wherein said lower reinforcement portion of said dropout support insert is configured as a flat, yoke-shaped structure having a central, inverted U-shaped region that conforms to the shape of said dropout notches and upturned feet that extend upwardly and in opposite directions from said inverted U-shaped region, and which reside in abutment against said lower ends of said fork legs between said dropout tabs.

11. A method of constructing a bicycle fork assembly according to claim 10, wherein each notch is generally tear-shaped.

12. A method of constructing a bicycle fork assembly according to claim 10, further comprising welding said distal extremities of said end closure tabs.

13. A method of constructing a bicycle fork assembly according to claim 10, further comprising forging a front brake cable access aperture through one of said end closure tabs.

14. A method of constructing a bicycle fork assembly according to claim 10, wherein said dropout support insert is further comprised of a stem extending between said lower reinforcement portion and said upper brace portion, and said upper brace portion has opposed upwardly diverging fork leg contact edges that are aligned in a plane oriented at right angles to said flat yoke-shaped structure.

* * * * *